United States Patent
Chen et al.

(10) Patent No.: US 12,051,805 B2
(45) Date of Patent: Jul. 30, 2024

(54) CATHODE HAVING MULTI-LAYER CATHODE COATING

(71) Applicant: SAFT AMERICA, Cockeysville, MD (US)

(72) Inventors: Xilin Chen, Lutherville Timonium, MD (US); Frank Cao, North Potomac, MD (US); Carine Margez Steinway, Baltimore, MD (US); Kamen Nechev, Baldwin, MD (US); Shih-Chieh Liao, Taoyuan (TW); Chia-Ming Chang, Hsinchu (TW); Dar-Jen Liu, Taoyuan (TW)

(73) Assignee: SAFT AMERICA, Cockeysville, MD (US)

( * ) Notice: Subject to any disclaimer, the term of this patent is extended or adjusted under 35 U.S.C. 154(b) by 0 days.

(21) Appl. No.: 17/974,996

(22) Filed: Oct. 27, 2022

(65) Prior Publication Data

US 2024/0145697 A1 May 2, 2024

(51) Int. Cl.
| | |
|---|---|
| *H01M 4/525* | (2010.01) |
| *H01M 4/36* | (2006.01) |
| *H01M 4/505* | (2010.01) |
| *H01M 10/0525* | (2010.01) |
| *H01M 4/02* | (2006.01) |

(52) U.S. Cl.
CPC ........... *H01M 4/525* (2013.01); *H01M 4/366* (2013.01); *H01M 4/505* (2013.01); *H01M 10/0525* (2013.01); *H01M 2004/021* (2013.01); *H01M 2004/028* (2013.01)

(58) Field of Classification Search
CPC .. H01M 4/366; H01M 10/0525; H01M 4/505; H01M 4/525
USPC .......................................................... 429/209
See application file for complete search history.

(56) References Cited

U.S. PATENT DOCUMENTS

| | | | |
|---|---|---|---|
| 7,803,485 | B2 | 9/2010 | Takezawa et al. |
| 10,651,460 | B2 | 5/2020 | Umeyama et al. |
| 2007/0015058 | A1 | 1/2007 | Takezawa et al. |
| 2011/0123866 | A1 | 5/2011 | Pan et al. |
| 2011/0168550 | A1 | 7/2011 | Wang et al. |
| 2012/0328942 | A1 | 12/2012 | Thomas-Alyea et al. |

(Continued)

FOREIGN PATENT DOCUMENTS

| | | |
|---|---|---|
| CN | 105140491 A | 12/2015 |
| CN | 106684395 A | 5/2017 |

(Continued)

OTHER PUBLICATIONS

International Search Report issued May 22, 2024 in Application No. PCT/US2023/035799.

(Continued)

*Primary Examiner* — James M Erwin
*Assistant Examiner* — John S Medley
(74) *Attorney, Agent, or Firm* — Sughrue Mion, PLLC

(57) ABSTRACT

A multi-layer cathode coating for positive electrode of a rechargeable electrochemical cell (or secondary cell) (such as a lithium-ion secondary battery) and a secondary battery including a cathode having a multi-layer cathode coating. Multi-layer cathode coatings containing blends of one or more cathode active materials in certain weight ratios thereof.

19 Claims, 3 Drawing Sheets

(56) References Cited

U.S. PATENT DOCUMENTS

| | | | |
|---|---|---|---|
| 2015/0349334 A1* | 12/2015 | Dumont | H01M 4/525 |
| | | | 429/220 |
| 2017/0162866 A1 | 6/2017 | Saka et al. | |
| 2019/0198864 A1* | 6/2019 | Chang | H01M 10/4235 |
| 2019/0363351 A1 | 11/2019 | Ota et al. | |
| 2020/0144600 A1* | 5/2020 | Zhong | H01M 4/505 |
| 2021/0202940 A1 | 7/2021 | Li et al. | |
| 2022/0140316 A1 | 5/2022 | Chen et al. | |

FOREIGN PATENT DOCUMENTS

| | | | | |
|---|---|---|---|---|
| CN | 108448054 A | | 8/2018 | |
| CN | 110212157 A | | 9/2019 | |
| CN | 110752345 A | | 2/2020 | |
| CN | 111048738 A | | 4/2020 | |
| CN | 111312985 A | | 6/2020 | |
| CN | 111333048 A | * | 6/2020 | C01B 25/45 |
| CN | 111725479 A | | 9/2020 | |
| CN | 113113567 A | | 7/2021 | |
| CN | 113948673 A | | 1/2022 | |
| EP | 2 474 037 A2 | | 7/2012 | |
| EP | 2 939 296 A1 | | 11/2015 | |
| EP | 3 249 720 A1 | | 11/2017 | |
| EP | 3 298 644 A1 | | 3/2018 | |
| EP | 3 391 980 A1 | | 10/2018 | |
| EP | 3804006 A1 | | 4/2021 | |
| JP | 2017-152295 A | | 8/2017 | |
| KR | 10-2016-0118586 A | | 10/2016 | |
| KR | 101839754 B1 | | 3/2018 | |
| WO | WO-2023070307 A1 | * | 5/2023 | H01M 10/4264 |

OTHER PUBLICATIONS

Written Opinion issued May 22, 2024 in Application No. PCT/US2023/035799.

* cited by examiner

FIG. 1 – Discharge capability of cells made with positive electrodes of Example 1 (J') and Comparative Example 1 (J)
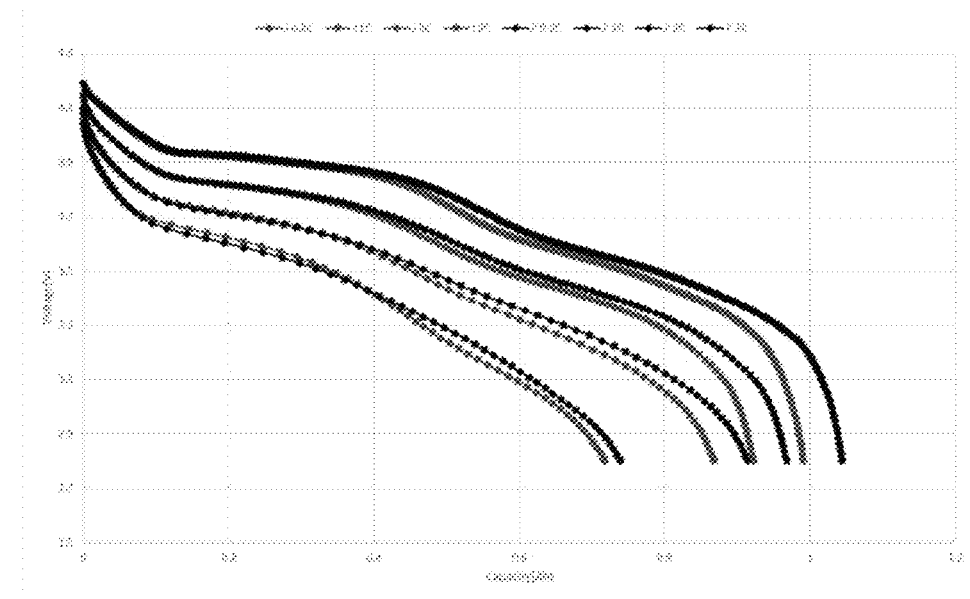
FIG. 2 – Discharge capability of cells made with positive electrodes of Example 2 (K') and Comparative Example 2 (K)
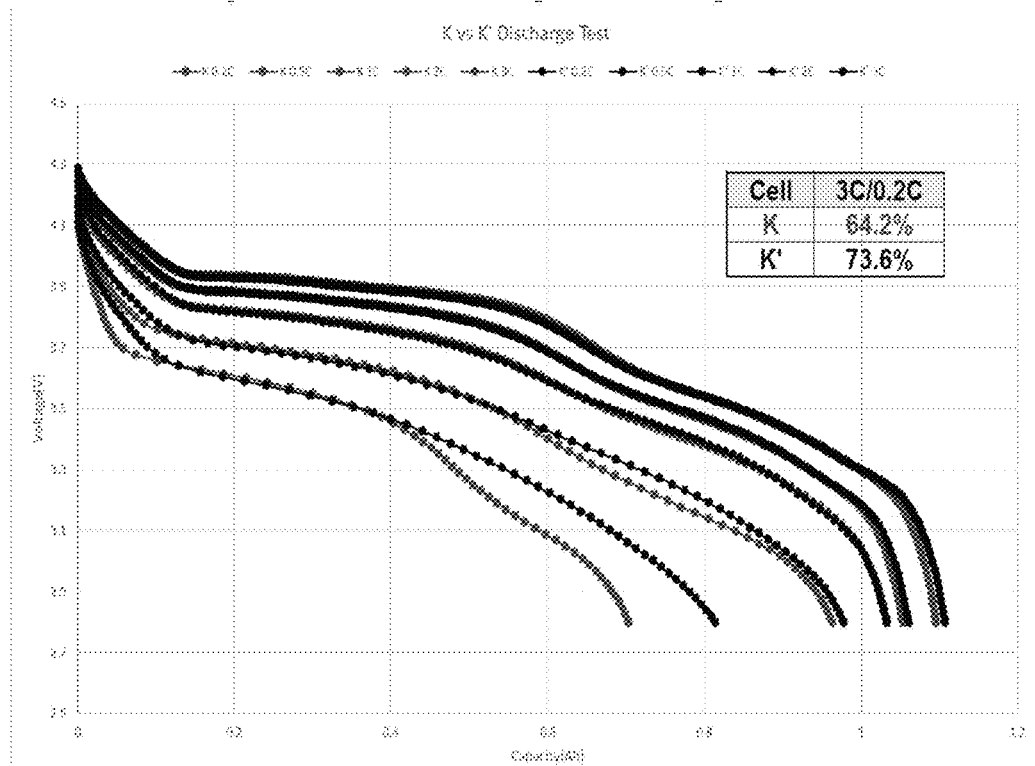

FIG. 3 – Chargeability of cells made with positive electrodes of Example 2 (K') and Comparative Example 2 (K)
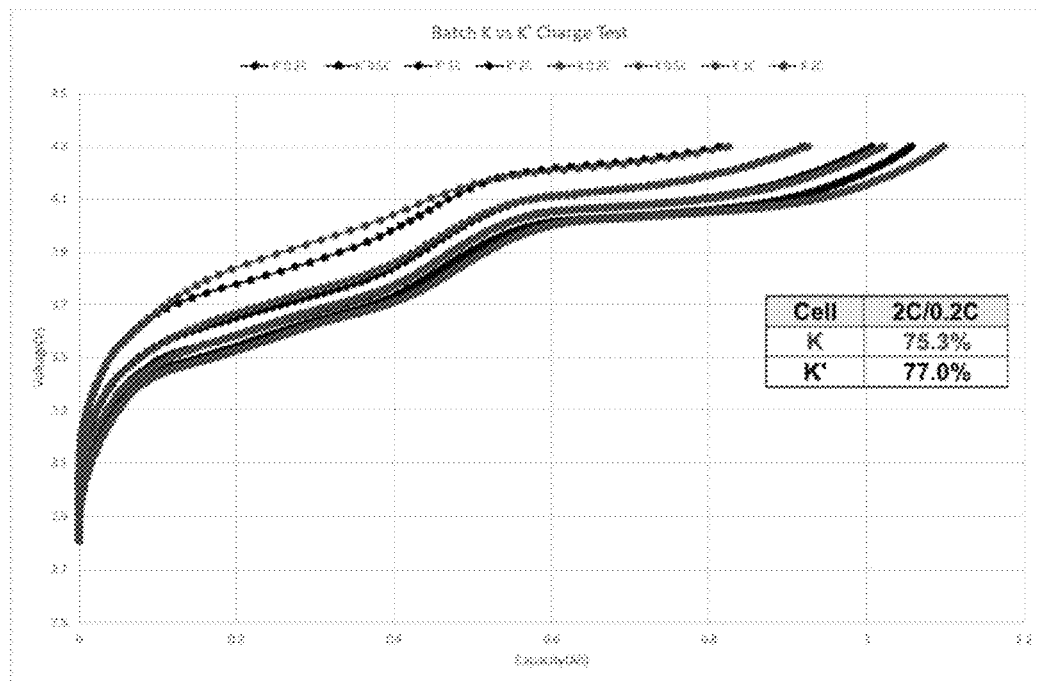
FIG. 4 – Capacity retention of cells made with positive electrodes of Example 2 (K') and Comparative Example 2 (K)
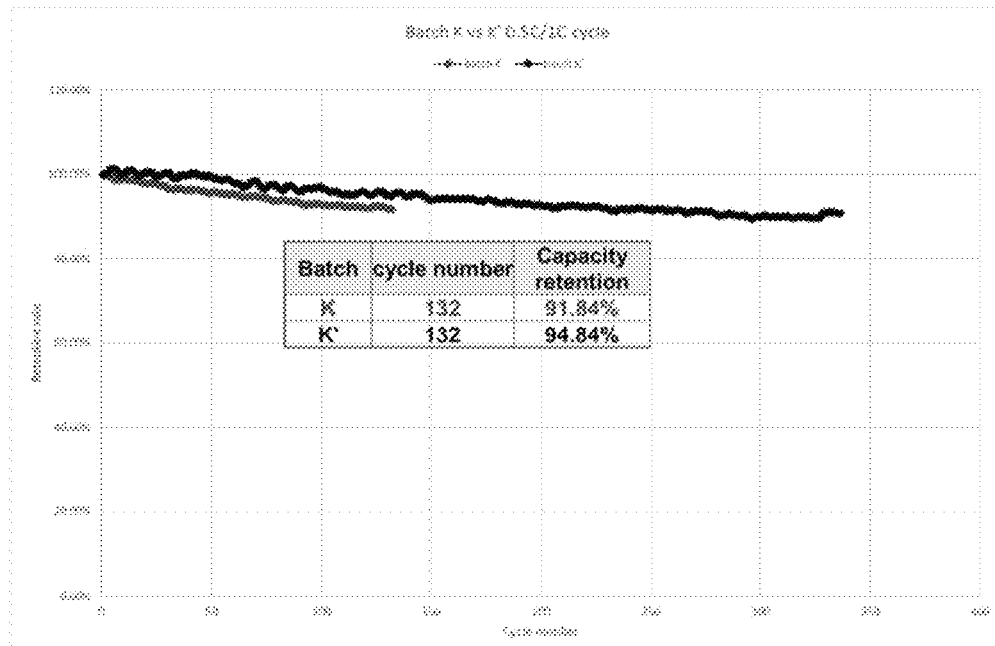

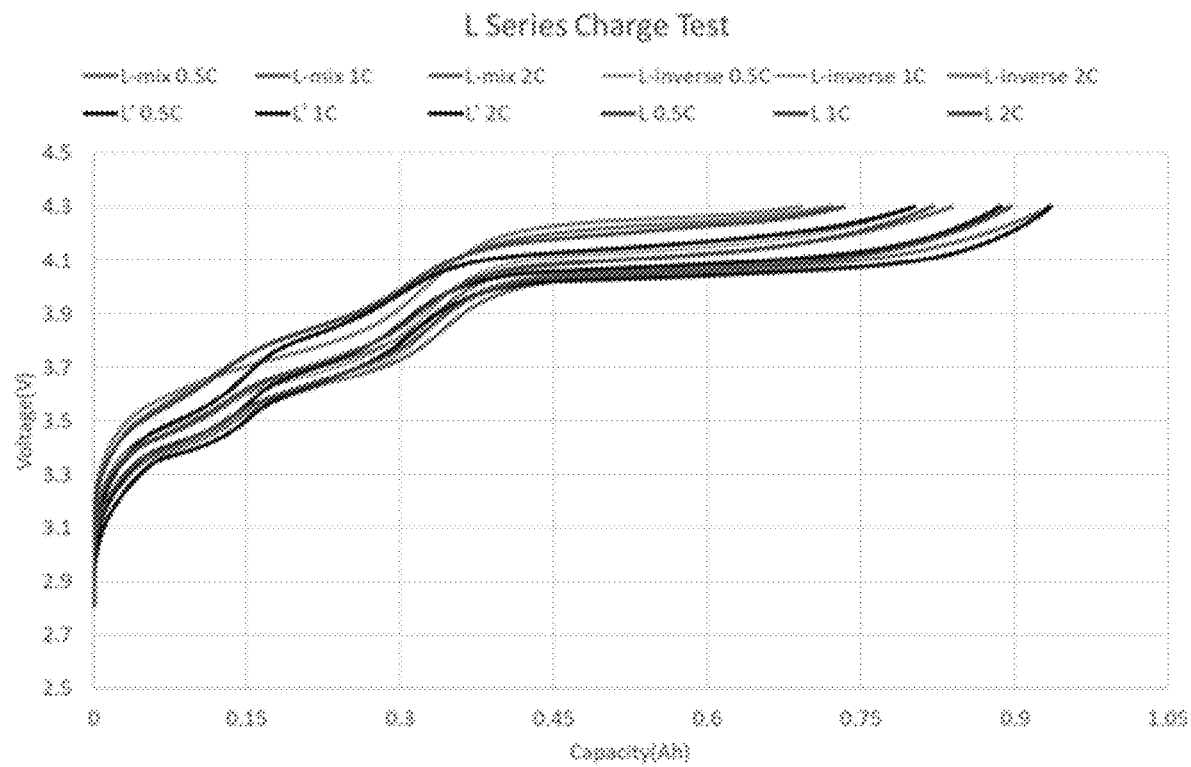
FIG. 5 – Chargeability of cells made with positive electrodes of Example 3 (L') and Comparative Examples 3 (L), 4 (L-inverse) and 5 (L-mix).
Charge Capability: L'> L> L-inverse≈ L-mix
| Charge Test CC only | 0.2C | 0.5C | 1C | 2C |
|---|---|---|---|---|
| L-mix | 100.0% | 90.9% | 81.7% | 70.2% |
| L-inverse | 100.0% | 91.5% | 82.8% | 71.2% |
| L' | 100.0% | 96.1% | 91.0% | 82.4% |
| L | 100.0% | 93.4% | 85.5% | 76.4% |

CATHODE HAVING MULTI-LAYER CATHODE COATING

BACKGROUND

Technical Field

The present disclosure relates to a cathode (or positive electrode) having a multi-layer cathode coating for use in a rechargeable electrochemical cell (or secondary cell, such as a lithium-ion secondary battery), wherein each layer of the multi-layer cathode coating has a different battery chemistry. The cathode may provide one or more benefits, such as, for example, better adhesion of a coating layer to the current collector, improved cell rate capability, and/or capacity retention.

Description of Related Art

In a secondary cell, an active material is a material which participates in the electrochemical reactions to produce electrical energy when the secondary cell is discharging.

Many materials for use as the cathode active material of a secondary cell are conventionally known, such as NMC, LFP, LMP, LFMP, LCP and LVPF (which are described in detail below).

Cathodes may be coated with one or more layers of coating which contain an active material. Conventionally, when a cathode is coated with one layer, such layer contains one active material or a blend of active materials, such NMC, LFP, LMP, LFMP, LCP and LVPF. When a cathode is coated with multiple layers of coating, each layer conventionally contains one active material, such as one of the materials enumerated above.

Improvements in cell design, such as battery chemistry, are still desired.

SUMMARY OF THE DISCLOSURE

It was determined, for example, that when a different battery chemistry is employed in each layer of the cathode, such as when a different blend of NMC and one or more of LFP, LMP, LFMP, LCP and LVPF is used in each layer of the cathode coating instead of the same active material chemistry for each layer, such a configuration may improve various characteristics of the cathode and a battery including the cathode. For example, certain compositions of active materials in positive electrode material layers of a multi-layer cathode coating may improve adhesion and processability of such layers to a current collector and/or require less pressure during calendering to obtain the same porosity. Cells assembled with a cathode having a multilayer coating where material layers contain different blends of positive electrode active materials may have, for example, improved discharge capability, performance at high discharge rate, charge capability, and/or capacity retention during cycle life testing.

Aspects of certain embodiments of the present disclosure demonstrated the above advantages and/or other advantages not described above. However, aspects of the embodiments are not required to demonstrate the advantages described above, and aspects of the embodiments may not have the advantages described above.

The embodiments of the present disclosure are directed to a positive electrode for a lithium-ion secondary battery including a current collector and a multi-layer cathode coating, wherein the positive electrode has a multi-layer cathode coating. A multilayer cathode coating includes at least a first positive electrode material layer, and a second positive electrode material layer, the second positive electrode material layer being disposed entirely on a "top" surface of the first positive electrode material layer relative to a "bottom" surface of the first positive electrode material layer contacting the current collector, wherein the first and second positive electrode material layers each have different battery chemistry relative to each other. For example, a different battery chemistry refers to physical and/or chemical differences, such as, for example, differences in porosity, differences in density, differences in active material, differences in particle size, and differences in proportions of materials.

According to one aspect, the present disclosure provides a positive electrode for a lithium-ion secondary battery, which includes:
a current collector; and
a multi-layer cathode coating including:
  a first positive electrode material layer, the first positive electrode material layer having a bottom surface disposed on the current collector and a top surface opposite to the bottom surface, and the first positive electrode material layer including a first positive active material, and
  a second positive electrode material layer having a bottom surface disposed on and directly contacting the top surface of the first positive electrode material layer, the second positive electrode material layer including a second positive active material,
the first positive active material includes a material represented by the following Formula (A) and/or Formula (B) in a total weight ratio W, and a material represented by the following Formula (C) in a weight ratio U;
the second positive active material includes a material represented by the following Formula (A) and/or Formula (B) in a total weight ratio Y, and a material represented by the following Formula (C) in a weight ratio Z;
the weight ratios W, U, Y, and Z are based on when a total weight of the first and second positive electrode active materials in the multi-layer cathode coating is considered to be 100 wt %;
W, U, Y, and Z are each greater than or equal to 0.0 wt % and less than 75.0 wt %;
W+U+Y+Z=100 wt %;
at least one of W and Y is not 0 wt %; and
at least one of U and Z is not 0 wt %;

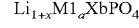    Formula (A), wherein, in Formula (A), MI is at least one of Fe, Mn, or Co; X is at least one of Ni, V, Y, Mg, Ca, Ba, Al, Sc, or Nd; $0 \leq x \leq 0.15$; $a>0$; $b>0$; and optionally $a+b=1$;

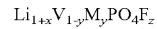    Formula (B), wherein, in Formula (B), $0<x\leq1$; $0\leq y\leq0.5$; $0.8\leq z\leq1.2$; and M is at least one of Ti, Al, Mg, Mn, Fe, Co, Y, Cr, Cu, Ni, or Zr.

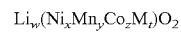    Formula (C), wherein, in Formula (C), $0.9\leq w\leq1.1$; $x>0$; $y>0$; $z>0$; $t\geq0$; M is at least one of Al, B, Mg, Si, Ca, Ti, V, Cr, Fe, Cu, Zn, Y, Zr, Nb, W, Mo, Sr, Ce, Ga, or Ta; and optionally $x+y+z+t=1$.

In some aspects of the disclosure, w does not equal y, or x does not equal z, or both of w does not equal y and x does not equal z.

In one aspect of the present disclosure, an absolute value of a difference between an average particle size of the first positive active material and an average particle size of the second positive electrode material may be, for example, about 2.5 μm to about 20.0 μm.

In one aspect of the present disclosure, an absolute value of a difference between a porosity of the first positive electrode material layer and a porosity of the second electrode material layer may be, for example, about 2.5% to about 50%.

In one aspect of the present disclosure, the first positive electrode material layer and/or the second positive electrode material layer may include a conductive agent.

In one aspect of the present disclosure, the total value for W (Formulas (A)/(B)) and U (Formula (C)) in the first layer may be, for example, in the range 20.0 wt %≤(W+U)≤80.0 wt %, or may be 30.0 wt %≤(W+U)≤70.0 wt %.

In one aspect of the present disclosure, the total value for Y (Formulas (A)/(B)) and Z (Formula (C)) in the second layer may be, for example, in the range 20.0 wt %≤(Y+Z) ≤80.0 wt %, or may be 30.0 wt %≤(Y+Z)≤70.0 wt %.

In some aspects of the present disclosure, the value for W, U, Y, and Z may be, for example, in the ranges 5.0 wt %≤W≤85.0 wt %, 5.0 wt %≤U≤85.0 wt %, 5.0 wt %≤Y≤85.0 wt %, and 5.0 wt %≤Z≤85.0 wt %.

In some aspects, the values for W, U, Y, and Z may be, for example, in the ranges 10.0 wt %≤W≤70.0 wt %, 10.0 wt %≤U≤70.0 wt %, 10.0 wt %≤Y≤70.0 wt %, and 10.0 wt %≤Z≤70.0 wt %.

In one aspect of the present disclosure, the material represented by the Formula (A) is one of the following Formula (A1), Formula (A2), Formula (A3), Formula (A4), or a blend thereof:

$$Li_{1+x}FePO_4 \quad \text{Formula (A1),}$$

wherein, in Formula (A1), 0≤x≤0.15;

$$Li_{1+x}MnPO_4 \quad \text{Formula (A2),}$$

wherein, in Formula (A2), 0≤x≤0.15;

$$Li_{1+x}CoPO_4 \quad \text{Formula (A3),}$$

wherein, in Formula (A3), 0≤x≤0.15;

$$Li_{1+x}Fe_yMn_zX_bPO_4 \quad \text{Formula (A4),}$$

wherein, in Formula (A4), X is at least one transition metal selected from Ni, V, Y, Mg, Ca, Ba, Al, Sc, or Nd; 0≤x≤0.15; y>0; z>0; b>0; and optionally y+z+b=1

In one aspect of the present disclosure, the material represented by the Formula (C) is $LiNi_{0.33}Mn_{0.33}Co_{0.33}O_2$ (NMC111), $LiNi_{0.5}Mn_{0.3}Co_{0.2}O_2$ (NMC532), $LiNi_{0.6}Mn_{0.2}Co_{0.2}O_2$ (NMC622), or $LiNi_{0.8}Mn_{0.1}Co_{0.1}O_2$ (NMC811).

In one aspect of the present disclosure, an average coating weight of the first positive electrode material layer may be, for example, about 5.0 to about 30.0 mg/cm²/side, and an average coating weight of the second positive electrode material layer may be, for example, about 5.0 to about 30.0 mg/cm²/side.

In some aspects, the first positive electrode material layer and/or the second positive electrode material layer may include a binder. When a binder is included, a total weight ratio of the conductive agent may be, for example, about 0.5 wt % to about 20 wt % when a total weight of the multi-layer cathode coating is 100 wt %.

In some aspects, an absolute value of a difference between W (Formulas (A)/(B) in the first layer) and Y (Formulas (A)/(B) in the second layer) may be, for example, about 10 wt % to about 80 wt %.

In some aspects, an absolute value of a difference between U (Formula (C) in the first layer) and Z (Formula (C) in the second layer) may be, for example, about 10 wt % to about 80 wt %.

In one aspect, the present disclosure provides a secondary battery including a positive electrode according to the present disclosure.

In one aspect, the secondary battery includes at least a cathode including the positive electrode active material according to the present disclosure; an anode including a negative electrode active material; and an electrolytic solution including a supporting salt and an organic solvent. When the battery is a lithium-ion secondary battery, the supporting salt can be a well-known lithium salt.

In another embodiment, the present disclosure provides a battery system that includes a plurality of electrically connected secondary batteries according to the present disclosure.

In one aspect, one or more secondary batteries in the battery system have a different battery chemistry from each other.

In one aspect, the battery system includes a plurality of secondary batteries according to the present disclosure, the plurality of batteries being electrically connected; and a battery management system configured to monitor a state of charge of the plurality of batteries based on a voltage of one or more battery of the plurality of batteries.

In one aspect, the materials in the first and the second active material are selected, for example, for the purpose of achieving an improved performance of a secondary battery. In one aspect, the materials are selected, for example, to improve one or more properties including discharge capability, performance at high discharge rate, charge capability, and/or capacity retention during cycle life testing.

Additional features and advantages of the present disclosure are described further below. This summary section is meant merely to illustrate certain features of the disclosure and is not meant to limit the scope of the disclosure in any way. The failure to discuss a specific feature or embodiment of the disclosure, or the inclusion of one or more features in this summary section, should not be construed to limit the claims.

BRIEF DESCRIPTION OF THE FIGURES

Any figures contained herein are provided only by way of example and not by way of limitation.

FIG. 1 is a chart showing discharge capability of cells made with positive electrodes of Example 1 (J') and Comparative Example 1 (J).

FIG. 2 is a chart showing discharge capability of cells made with positive electrodes of Example 2 (K') and Comparative Example 2 (K).

FIG. 3 is a chart showing chargeability of cells made with positive electrodes of Example 2 (K') and Comparative Example 2 (K).

FIG. 4 is a chart showing capacity retention of cells made with positive electrodes of Example 2 (K') and Comparative Example 2 (K).

FIG. 5 is a chart showing chargeability of cells made with positive electrodes of Example 3 (L') and Comparative Examples 3 (L), 4 (L-inverse) and 5 (L-mix).

DETAILED DESCRIPTION OF THE EMBODIMENTS OF THE DISCLOSURE

It is to be understood that both the foregoing general description and the following detailed description are exemplary and are intended to provide further explanation of the claims. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Any range will be understood to encompass and be a disclosure of each discrete point and subrange within the range, even when one or more subranges are disclosed. Stated differently, the ranges in the present disclosure are equivalent to a subset of the unwieldy and lengthy description of every possible combination of these discrete values, presented in an easily understood shorthand format (i.e., a range). The upper or lower value of any numerical range may also be replaced with the upper or lower value of another numerical range, respectively. The upper or lower value of a numerical range may also be replaced with an upper or lower value described in Examples below.

Unless defined otherwise, all technical and scientific terms used herein have the same meaning as commonly understood by one of ordinary skill in the art to which this disclosure belongs. Any methods and materials similar or equivalent to those described herein may be used in the practice or testing of the disclosure, as it will be understood that modifications and variations are encompassed within the spirit and scope of the instant disclosure.

As used herein, "about," "approximately," "substantially," and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term, and "substantially" and "significantly" will mean plus or minus >10% of the particular term. "Comprising" and "consisting essentially of" have their customary meaning in the art.

Cathode

The cathode of the present disclosure is not particularly limited except for that the cathode contains the multi-layer cathode coating.

The multi-layer cathode coating includes: (i) a first positive electrode material layer, the first positive electrode material layer having a bottom surface disposed on the current collector, a top surface opposite to the bottom surface, and the first positive electrode material layer including a first positive active material (also referred to as positive electrode active material); and (ii) a second positive electrode material layer, the second positive electrode material layer having a bottom surface disposed on and directly contacting the top surface of the first positive electrode material layer, and the second positive electrode material layer including a second positive active material. However, the multi-layer cathode coating may include one or more additional positive electrode material layers or may not include any other additional positive electrode material layers.

The first and second positive electrode material layers each have different battery chemistry relative to each other, e.g., this may be one or more physical and/or chemical differences, such as, for example, differences in porosity, differences in density, differences in active material, differences in particle size, and/or differences in proportions of materials.

POSITIVE ACTIVE MATERIALS

The first positive active material includes a material represented by the Formula (A) and/or Formula (B) in a total weight ratio W, and a material represented by the Formula (C) in a weight ratio U (this may be visually represented (A/B)W(C)U).

The second positive active material includes a material represented by the Formula (A) and/or Formula (B) in a total weight ratio Y, and a material represented by the Formula (C) in a weight ratio Z (this may be visually represented (A/B)Y(C)Z).

For the first and second positive active materials:
W, U, Y, and Z are each greater than or equal to 0.0 wt % and less than 75.0 wt %;
W+U+Y+Z=100 wt %;
at least one of W and Y is not 0 wt %; and
at least one of U and Z is not 0 wt %.

In some aspects, W does not equal Y, or U does not equal Z, or both of W does not equal Y and U does not equal Z.

<FORMULA (A)>

The first and the second positive active material may include a material represented by the following Formula (A):

$$Li_{1+x}M1_aX_bPO_4 \quad \text{Formula (A) (LFP,LMP,LCP,LFMP)},$$

LFP=lithium iron phosphate
LMP=lithium manganese phosphate
LCP=lithium cobalt phosphate
LFMP=lithium iron manganese phosphate In Formula (A), M1 is at least one of Fe, Mn, or Co; X is at least one of Ni, V, Y, Mg, Ca, Ba, Al, Sc, or Nd; $0 \le x \le 0.15$; a>0; b>0; and optionally a+b=1.

The material according to the Formula (A) can be one of the following Formula (A1) (i.e., LFP), Formula (A2) (i.e., LMP), Formula (A3) (i.e., LCP) or Formula (A4) (i.e., LFMP) or a blend thereof:

$$Li_{1+x}FePO_4 \quad \text{Formula (A1)},$$

wherein, in Formula (A1), $0 \le x \le 0.15$;

$$Li_{1+x}MnPO_4 \quad \text{Formula (A2)},$$

wherein, in Formula (A2), $0 \le x \le 0.15$;

$$Li_{1+x}CoPO_4 \quad \text{Formula (A3)},$$

wherein, in Formula (A3), $0 \le x \le 0.15$;

$$Li_{1+x}Fe_yMn_zX_bPO_4 \quad \text{Formula (A4)},$$

wherein, in Formula (A4), X is at least one transition metal selected from Ni, V, Y, Mg, Ca, Ba, Al, Sc, or Nd; $0 \le x \le 0.15$; y>0; z>0; b>0; and optionally y+z+b=1.

As noted above, the general term "LFP" means Formula (A1), the general term "LMP" means Formula (A2), the general term "LCP" means Formula (A3), and the general term "LFMP" means Formula (A4).

In one aspect, the material of the Formula (A) may, for example, be coated with carbon nanotubes (CNT) by a known method prior to being included in the positive electrode material layer (that is, prior to being mixed with any other components of the positive electrode material layer). One example product is CNT-coated LFMP, i.e., LFMP coated with CNT. The coating amount may be, for example, about 0.5 wt % to about 5 wt %, when a total weight of the CNT-coated Formula (A) active material is considered 100 wt %.

Formula (B)

The first and the second positive active material may include a material represented by the following Formula (B):

$$Li_{1+x}V_{1-y}M_yPO_4F_z \quad \text{Formula (B) (LVPF)},$$

wherein, in Formula (B), $0<x\leq1$; $0\leq y\leq0.5$; $0.8\leq z\leq1.2$; and M is at least one of Ti, Al, Mg, Mn, Fe, Co, Y, Cr, Cu, Ni, or Zr.

In one aspect, the material of the Formula (B) may, for example, be coated with CNT by a known method prior to being included in the positive electrode material layer. In another aspect, a blend of the active materials of the Formula (A) and (B) may, for example, be coated with a CNT. The coating amount may be, for example, about 0.5 wt % to about 5 wt %, when a total weight of the CNT-coated Formula (B) active material is considered 100 wt %.

Formula (C)

The first and the second positive active material includes material of the following formula (C):

$$Li_w(Ni_xMn_yCo_zM_t)O_2 \quad \text{Formula (C)},$$

wherein, in Formula (C), $0.9\leq w\leq1.1$; $x>0$; $y>0$; $z>0$; $t\geq0$; M is at least one of Al, B, Mg, Si, Ca, Ti, V, Cr, Fe, Cu, Zn, Y, Zr, Nb, W, Mo, Sr, Ce, Ga, Ta, or mixtures thereof; and optionally $x+y+z+t=1$.

In one aspect, the material of the Formula (C) may, for example, be coated with CNT by a known method prior to being included in the positive electrode material layer. The coating amount may be, for example, about 0.5 wt % to about 5 wt %, when a total weight of the CNT-coated Formula (C) active material is considered 100 wt %

WEIGHT RATIOS W, X, Y, AND Z

As noted above, weight ratios W, U, Y, and Z are based on when a total weight of the first and second positive electrode active materials in the multi-layer cathode coating is considered to be 100 wt %. That is, the sum of ratios w, x, y and z equals 100%.

In some aspects, the ratios W, U, Y, and Z can each be, for example, greater than or equal to about 0.0 wt % and less than or equal to about 85.0 wt %, greater than or equal to about 5.0 wt % and less than or equal to about 85.0 wt %, greater than or equal to about 10.0 wt % and less than or equal to about 85.0 wt %, greater than or equal to about 0.0 wt % and less than or equal to about 80.0 wt %, greater than or equal to about 5.0 wt % and less than or equal to about 80.0 wt %, greater than or equal to about 10.0 wt % and less than or equal to about 80.0 wt %, greater than or equal to about 0.0 wt % and less than or equal to about 75.0 wt %, greater than or equal to about 5.0 wt % and less than or equal to about 75.0 wt %, greater than or equal to about 10.0 wt % and less than or equal to about 75.0 wt %, greater than or equal to about 0.0 wt % and less than or equal to about 70.0 wt %, greater than or equal to about 5.0 wt % and less than or equal to about 70.0 wt %, greater than or equal to about 10.0 wt % and less than or equal to about 70.0 wt %.

In some aspects, the ratios W, U, Y, and Z can each be, independently, for example, about 1.0 wt %, about 5.0 wt %, about 10.0 wt %, about 15.0 wt %, about 20.0 wt %, about 25.0 wt %, about 30.0 wt %, about 35.0 wt %, about 40.0 wt %, about 45.0 wt %, about 50.0 wt %, about 55.0 wt %, about 60.0 wt %, about 65.0 wt %, about 70.0 wt %, about 75.0 wt %, about 80.0 wt %, about 85.0 wt %.

In some aspects, an absolute value of a difference between W and Y can be, for example, about 10 wt % to about 80 wt %.

In some aspects, an absolute value of a difference between W and Y can be, for example, about 10 wt % to about 80 wt %, about 10 wt % to about 70 wt %, about 10 wt % to about 60 wt %, about 10 wt % to about 50 wt %, about 10 wt % to about 40 wt %, about 10 wt % to about 30 wt %, about 10 wt % to about 20 wt %, about 20 wt % to about 80 wt %, about 30 wt % to about 80 wt %, about 40 wt % to about 80 wt %, about 50 wt % to about 80 wt %, about 60 wt % to about 80 wt % or about 70 wt % to about 80 wt %.

In some aspects, an absolute value of a difference between W and Y can be, for example, about 10 wt %, about 20 wt %, about 30 wt %, about 40 wt %, about 50 wt %, about 60 wt %, about 70 wt % or about 80 wt %.

In some aspects, an absolute value of a difference between U and Z can be, for example, about 10 wt % to about 80 wt %.

In some aspects, an absolute value of a difference between U and Z can be, for example, about 10 wt % to about 80 wt %, about 10 wt % to about 70 wt %, about 10 wt % to about 60 wt %, about 10 wt % to about 50 wt %, about 10 wt % to about 40 wt %, about 10 wt % to about 30 wt %, about 10 wt % to about 20 wt %, about 20 wt % to about 80 wt %, about 30 wt % to about 80 wt %, about 40 wt % to about 80 wt %, about 50 wt % to about 80 wt %, about 60 wt % to about 80 wt % or about 70 wt % to about 80 wt %.

In some aspects, an absolute value of a difference between U and Z can be, for example, about 10 wt %, about 20 wt %, about 30 wt %, about 40 wt %, about 50 wt %, about 60 wt %, about 70 wt % or about 80 wt %.

In some aspects, a total weight ratio of the first positive active material and the second positive active material can be, for example, about 75.0 wt % to about 98.0 wt % when a total weight of the multi-layer cathode coating is 100 wt %.

In some aspects, a total weight ratio of the first positive active material and the second positive active material, when a total weight of the multi-layer cathode coating is 100 wt %, can be about 75.0 wt % to about 98.0 wt %, about 80.0 wt % to about 98.0 wt %, about 85.0 wt % to about 98.0 wt %, about 90.0 wt % to about 98.0 wt %, about 95.0 wt % to about 98.0 wt %, about 75.0 wt % to about 95.0 wt %, about 75.0 wt % to about 90.0 wt %, about 75.0 wt % to about 85.0 wt % or about 75.0 wt % to about 80.0 wt %.

Active Material Particle Size

In some embodiments, an average particle size of the first positive active material may be the same as an average particle size of the second positive electrode material, or the average particle size of the first positive active material may be different from the average particle size of the second positive electrode material.

When the average particle sizes are different, the absolute value of a difference between the average particle size of the first positive active material and the average particle size of the second positive electrode material may be, for example, about 2.5 µm to about 20.0 µm. For example, this absolute value of the difference may be, for example, about 3.5 µm, about 4.5 µm, about 5.5 µm, about 6.5 µm, about 7.5 µm, about 8.5 µm, about 9.5 µm, about 10.5 µm, about 11.5 µm, about 12.5 µm, about 13.5 µm, about 14.5 µm, about 15.5 µm, about 16.5 µm, about 17.5 µm, about 18.5 µm, or about 19.5 µm.

The average particle size refers to the size of the aggregate secondary particles made up of primary particles of the active material. The average particle size may be determined, for example, by microscopy techniques, a Laser Diffraction analyzer, and other suitable techniques known in the art. The particle size distribution is characterized by a median volume diameter (Dv50) of the particles. The term "median volume diameter Dv50 of X µm" means that 50% of the total volume of the particles is the volume of the particles having an equivalent diameter of less than X µm and 50% of the volume of the particles is the volume of the particles having an equivalent diameter greater than X µm. The term "equivalent diameter" of a particle designates the diameter of a sphere having the same volume as this particle. The particle size distribution may be determined, for example, by laser diffraction.

The particle size at which a cumulative volume value is 50% in the obtained particle size distribution is determined as the average particle size.

Porosity

In some embodiments, the porosity of the first electrode material layer may be equivalent to the porosity of the second electrode material layer.

In some embodiments, the porosity of the first electrode material layer may be different from the porosity of the second electrode material layer.

In some embodiments, the total porosity of the two layers may be, for example, about 15% to about 55%, about 15% to about 54%, about 15% to about 53%, about 15% to about 52%, about 15% to about 51%, about 15% to about 50%, about 15% to about 49%, about 15% to about 48%, about 15% to about 47%, about 15% to about 46%, about 15% to about 45%, about 15% to about 44%, about 15% to about 43%, about 15% to about 42%, about 15% to about 41%, about 15% to about 40%, about 15% to about 39%, about 15% to about 38%, about 15% to about 37%, about 15% to about 36%, about 15% to about 35%, about 15% to about 34%, about 15% to about 33%, about 15% to about 32%, about 15% to about 31%, about 15% to about 30%, about 15% to about 29%, about 15% to about 28%, about 15% to about 27%, about 15% to about 26%, about 15% to about 25%, about 15% to about 24%, about 15% to about 23%, about 15% to about 22%, about 15% to about 21%, about 15% to about 20%, about 15% to about 19%, about 15% to about 18%, about 15% to about 17%, or about 15% to about 16%.

In some embodiments, the total porosity of the two layers may be, for example, about 16% to about 55%, about 17% to about 55%, about 18% to about 55%, about 19% to about 55%, about 20% to about 55%, about 21% to about 55%, about 22% to about 55%, about 23% to about 55%, about 24% to about 55%, about 25% to about 55%, about 26% to about 55%, about 27% to about 55%, about 28% to about 55%, about 29% to about 55%, about 30% to about 55%, about 31% to about 55%, about 32% to about 55%, about 33% to about 55%, about 34% to about 55%, about 35% to about 55%, about 36% to about 55%, about 37% to about 55%, about 38% to about 55%, about 39% to about 55%, about 40% to about 55%, about 41% to about 55%, about 42% to about 55%, about 43% to about 55%, about 44% to about 55%, about 45% to about 55%, about 46% to about 55%, about 47% to about 55%, about 48% to about 55%, about 49% to about 55%, about 50% to about 55%, about 51% to about 55%, about 52% to about 55%, about 53% to about 55% or about 54% to about 55%.

In some embodiments, the total porosity of the two layers may be, for example, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54% or about 55%.

In some embodiments, the porosity of the first electrode material layer and the porosity of the second electrode material layer may be, for example, independently, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54% or about 55%.

In some embodiments, an absolute value of a difference between a porosity of the first positive electrode material layer and a porosity of the second positive electrode material layer may be, for example, about 2.5% to about 50%.

In some embodiments, an absolute value of a difference between a porosity of the first positive electrode material layer and a porosity of the second electrode material layer may be, for example, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10.0%, about 10.5%, about 11.0%, about 11.5%, about 12.0%, about 12.5%, about 13.0%, about 13.5%, about 14.0%, about 14.5%, about 15.0%, about 15.5%, about 16.0%, about 16.5%, about 17.0%, about 17.5%, about 18.0%, about 18.5%, about 19.0%, about 19.5%, about 20.0%, about 20.5%, about 21.0%, about 21.5%, about 22.0%, about 22.5%, about 23.0%, about 23.5%, about 24.0%, about 24.5%, about 25.0%, about 25.5%, about 26.0%, about 26.5%, about 27.0%, about 27.5%, about 28.0%, about 28.5%, about 29.0%, about 29.5%, about 30.0%, about 30.5%, about 31.0%, about 31.5%, about 32.0%, about 32.5%, about 33.0%, about 33.5%, about 34.0%, about 34.5%, about 35.0%, about 35.5%, about 36.0%, about 36.5%, about 37.0%, about 37.5%, about 38.0%, about 38.5%, about 39.0%, about 39.5%, about 40.0%, about 40.5%, about 41.0%, about 41.5%, about 42.0%, about 42.5%, about 43.0%, about 43.5%, about 44.0%, about 44.5%, about 45.0%, about 45.5%, about 46.0%, about 46.5%, about 47.0%, about 47.5%, about 48.0%, about 48.5%, about 49.0%, about 49.5% or about 50.0%.

Coating Weight and Loading

In some embodiments, an average coating weight of the first and the second positive electrode material layer may be, for example, independently about 5.0 to about 30.0 mg/cm$^2$/side.

In some embodiments, an average coating weight of the first and the second positive electrode material layer may be, for example, independently, about 5.5 mg/cm²/side to about 29.5 mg/cm²/side, about 6.0 mg/cm²/side to about 29.0 mg/cm²/side, about 6.5 mg/cm²/side to about 28.5 mg/cm²/side, about 7.0 mg/cm²/side to about 28.0 mg/cm²/side, about 7.5 mg/cm²/side to about 27.5 mg/cm²/side, about 8.0 mg/cm²/side to about 27.0 mg/cm²/side, about 8.5 mg/cm²/side to about 26.5 mg/cm²/side, about 9.0 mg/cm²/side to about 26.0 mg/cm²/side, about 9.5 mg/cm²/side to about 25.5 mg/cm²/side, about 10.0 mg/cm²/side to about 25.0 mg/cm²/side, about 10.5 mg/cm²/side to about 24.5 mg/cm²/side, about 11.0 mg/cm²/side to about 24.0 mg/cm²/side, about 11.5 mg/cm²/side to about 23.5 mg/cm²/side, about 12.0 mg/cm²/side to about 23.0 mg/cm²/side, about 12.5 mg/cm²/side to about 22.5 mg/cm²/side, about 13.0 mg/cm²/side to about 22.0 mg/cm²/side, about 13.5 mg/cm²/side to about 21.5 mg/cm²/side, about 14.0 mg/cm²/side to about 21.0 mg/cm²/side, about 14.5 mg/cm²/side to about 20.5 mg/cm²/side, about 15.0 mg/cm²/side to about 20.0 mg/cm²/side, about 15.5 mg/cm²/side to about 19.5 mg/cm²/side, about 16.0 mg/cm²/side to about 19.0 mg/cm²/side, about 16.5 mg/cm²/side to about 18.5 mg/cm²/side, about 17.0 mg/cm²/side to about 18.0 mg/cm²/side, about 17.5 mg/cm²/side to about 18.0 mg/cm²/side In some embodiments, an average coating weight of the first and the second positive electrode material layer may be, for example, independently, about 5.5 mg/cm²/side to about 30.0 mg/cm²/side, about 6.0 mg/cm²/side to 30.0 mg/cm²/side, about 6.5 mg/cm²/side to 30.0 mg/cm²/side, about 7.0 mg/cm²/side to 30.0 mg/cm²/side, about 7.5 mg/cm²/side to 30.0 mg/cm²/side, about 8.0 mg/cm²/side to 30.0 mg/cm²/side, about 8.5 mg/cm²/side to 30.0 mg/cm²/side, about 9.0 mg/cm²/side to 30.0 mg/cm²/side, about 9.5 mg/cm²/side to 30.0 mg/cm²/side, about 10.0 mg/cm²/side to 30.0 mg/cm²/side, about 10.5 mg/cm²/side to 30.0 mg/cm²/side, about 11.0 mg/cm²/side to 30.0 mg/cm²/side, about 11.5 mg/cm²/side to 30.0 mg/cm²/side, about 12.0 mg/cm²/side to 30.0 mg/cm²/side, about 12.5 mg/cm²/side to 30.0 mg/cm²/side, about 13.0 mg/cm²/side to 30.0 mg/cm²/side, about 13.5 mg/cm²/side to 30.0 mg/cm²/side, about 14.0 mg/cm²/side to 30.0 mg/cm²/side, about 14.5 mg/cm²/side to 30.0 mg/cm²/side, about 15.0 mg/cm²/side to 30.0 mg/cm²/side, about 15.5 mg/cm²/side to 30.0 mg/cm²/side, about 16.0 mg/cm²/side to 30.0 mg/cm²/side, about 16.5 mg/cm²/side to 30.0 mg/cm²/side, about 17.0 mg/cm²/side to 30.0 mg/cm²/side, about 17.5 mg/cm²/side to 30.0 mg/cm²/side, about 18.0 mg/cm²/side to 30.0 mg/cm²/side, about 18.5 mg/cm²/side to 30.0 mg/cm²/side, about 19.0 mg/cm²/side to 30.0 mg/cm²/side, about 19.5 mg/cm²/side to 30.0 mg/cm²/side, about 20.0 mg/cm²/side to 30.0 mg/cm²/side, about 20.5 mg/cm²/side to 30.0 mg/cm²/side, about 21.0 mg/cm²/side to 30.0 mg/cm²/side, about 21.5 mg/cm²/side to 30.0 mg/cm²/side, about 22.0 mg/cm²/side to 30.0 mg/cm²/side, about 22.5 mg/cm²/side to 30.0 mg/cm²/side, about 23.0 mg/cm²/side to 30.0 mg/cm²/side, about 23.5 mg/cm²/side to 30.0 mg/cm²/side, about 24.0 mg/cm²/side to 30.0 mg/cm²/side, about 24.5 mg/cm²/side to 30.0 mg/cm²/side, about 25.0 mg/cm²/side to 30.0 mg/cm²/side, about 25.5 mg/cm²/side to 30.0 mg/cm²/side, about 26.0 mg/cm²/side to 30.0 mg/cm²/side, about 26.5 mg/cm²/side to 30.0 mg/cm²/side, about 27.0 mg/cm²/side to 30.0 mg/cm²/side, about 27.5 mg/cm²/side to 30.0 mg/cm²/side, about 28.0 mg/cm²/side to 30.0 mg/cm²/side, about 28.5 mg/cm²/side to 30.0 mg/cm²/side, about 29.0 mg/cm²/side to 30.0 mg/cm²/side or about 29.5 mg/cm²/side to 30.0 mg/cm²/side.

In some embodiments, an average coating weight of the first and the second positive electrode material layer may be, for example, independently about 5.0 mg/cm²/side to about 29.5 mg/cm²/side, about 5.0 mg/cm²/side to about 29.0 mg/cm²/side, about 5.0 mg/cm²/side to about 28.5 mg/cm²/side, about 5.0 mg/cm²/side to about 28.0 mg/cm²/side, about 5.0 mg/cm²/side to about 27.5 mg/cm²/side, about 5.0 mg/cm²/side to about 27.0 mg/cm²/side, about 5.0 mg/cm²/side to about 26.5 mg/cm²/side, about 5.0 mg/cm²/side to about 26.0 mg/cm²/side, about 5.0 mg/cm²/side to about 25.5 mg/cm²/side, about 5.0 mg/cm²/side to about 25.0 mg/cm²/side mg/cm²/side, about 5.0 mg/cm²/side to about 24.5 mg/cm²/side, about 5.0 mg/cm²/side to about 24.0 mg/cm²/side, about 5.0 mg/cm²/side to about 23.5 mg/cm²/side, about 5.0 mg/cm²/side to about 23.0 mg/cm²/side, about 5.0 mg/cm²/side to about 22.5 mg/cm²/side, about 5.0 mg/cm²/side to about 22.0, about 5.0 mg/cm²/side to about 21.5, about 5.0 mg/cm²/side to about 21.0, about 5.0 mg/cm²/side to about 20.5 mg/cm²/side, about 5.0 mg/cm²/side to about 20.0 mg/cm²/side, about 5.0 mg/cm²/side to about 19.5 mg/cm²/side, about 5.0 mg/cm²/side to about 19.0 mg/cm²/side, about 5.0 mg/cm²/side to about 18.5 mg/cm²/side, about 5.0 mg/cm²/side to about 18.0 mg/cm²/side, 45.0 mg/cm²/side to about 17.5 mg/cm²/side, about 5.0 mg/cm²/side to about 17.0 mg/cm²/side, about 5.0 mg/cm²/side to about 16.5 mg/cm²/side, about 5.0 mg/cm²/side to about 16.0 mg/cm²/side, about 5.0 mg/cm²/side to about 15.5 mg/cm²/side, about 5.0 mg/cm²/side to about 15.0 mg/cm²/side mg/cm²/side, about 5.0 mg/cm²/side to about 14.5 mg/cm²/side, about 5.0 mg/cm²/side to about 14.0 mg/cm²/side, about 5.0 mg/cm²/side to about 13.5 mg/cm²/side, about 5.0 mg/cm²/side to about 13.0 mg/cm²/side, about 5.0 mg/cm²/side to about 12.5 mg/cm²/side, about 5.0 mg/cm²/side to about 12.0 mg/cm²/side, about 5.0 mg/cm²/side to about 11.5 mg/cm²/side, about 5.0 mg/cm²/side to about 11.0 mg/cm²/side, about 5.0 mg/cm²/side to about 10.5 mg/cm²/side, about 5.0 mg/cm²/side to about 10.0 mg/cm²/side, about 5.0 mg/cm²/side to about 9.5 mg/cm²/side, about 5.0 mg/cm²/side to about 9.0 mg/cm²/side, about 5.0 mg/cm²/side to about 8.5 mg/cm²/side, about 5.0 mg/cm²/side to about 8.0 mg/cm²/side, about 5.0 mg/cm²/side to about 7.5 mg/cm²/side, about 5.0 mg/cm²/side to about 7.0 mg/cm²/side, about 5.0 mg/cm²/side to about 6.5, about 5.0 mg/cm²/side, about 5.0 mg/cm²/side to about 6.0 mg/cm²/side, about 5.0 mg/cm²/side to about 5.5 mg/cm²/side In some embodiments, an average coating weight of the first and the second positive electrode material layer may be, for example, independently about 5.0 mg/cm²/side, about 5.5 mg/cm²/side, about 6.0 mg/cm²/side, about 6.5 mg/cm²/side, about 7.0 mg/cm²/side, about 7.5 mg/cm²/side, about 8.0 mg/cm²/side, about 8.5 mg/cm²/side, about 9.0 mg/cm²/side, about 9.5 mg/cm²/side, about 10.0 mg/cm²/side, about 10.0 mg/cm²/side, about 11.0 mg/cm²/side, about 11.5 mg/cm²/side, about 12.0 mg/cm²/side, about 12.5 mg/cm²/side, about 13.0 mg/cm²/side, about 13.0 mg/cm²/side, about 14.0 mg/cm²/side, about 14.5 mg/cm²/side, about 15.0 mg/cm²/side, about 15.5 mg/cm²/side, about 16.0 mg/cm²/side, about 16.5 mg/cm²/side, about 17.0 mg/cm²/side, about 17.5 mg/cm²/side, about 18.0 mg/cm²/side, about 18.5 mg/cm²/side, about 19.0 mg/cm²/side, about 19.5 mg/cm²/side, about 20.0 mg/cm²/side, about 20.5 mg/cm²/side, about 21.0 mg/cm²/side, about 21.5 mg/cm²/side, about 22.0 mg/cm²/side, about 22.5 mg/cm²/side, about 23.0 mg/cm²/side, about 23.5 mg/cm²/side, about 24.0 mg/cm²/side, about 24.5 mg/cm²/side, about 25.0 mg/cm²/side, about 25.5 mg/cm²/side, about 26.0 mg/cm²/side, about 26.5 mg/cm²/ side, about 27.0 mg/cm²/side, about 27.5 mg/cm²/side, about 28.0 mg/cm²/side, about 28.5 mg/cm²/side, about 29.0 mg/cm²/side, about 29.5 mg/cm²/side or about 30.0 mg/cm²/side.

In some embodiments, the designated layer loading per single side of the first and the second positive electrode material layer may be equal.

In some embodiments, the designated layer loading per single side of the first and the second positive electrode material layer may be different.

In some embodiments, the designated layer loading per single side of the first and the second positive electrode material layer may be, for example, about 4.0 to about 22.0 mg/cm².

In some embodiments, the designated layer loading per single side of the first and the second positive electrode material layer may be, for example, about 4.0 to about 22.0 mg/cm², about 4.5 to about 22.0 mg/cm², about 5.0 to about 22.0 mg/cm², about 5.5 to about 22.0 mg/cm², about 6.0 to about 22.0 mg/cm², about 6.5 to about 22.0 mg/cm², about 7.0 to about 22.0 mg/cm², about 7.5 to about 22.0 mg/cm², about 8.0 to about 22.0 mg/cm², about 8.5 to about 22.0 mg/cm², about 9.0 to about 22.0 mg/cm², about 9.5 to about 22.0 mg/cm², about 10.0 to about 22.0 mg/cm², about 10.5 to about 22.0 mg/cm², about 11.0 to about 22.0 mg/cm², about 11.5 to about 22.0 mg/cm², about 12.0 to about 22.0 mg/cm², about 12.5 to about 22.0 mg/cm², about 13.0 to about 22.0 mg/cm², about 13.5 to about 22.0 mg/cm², about 14.0 to about 22.0 mg/cm², about 14.5 to about 22.0 mg/cm², about 15.0 to about 22.0 mg/cm², about 15.5 to about 22.0 mg/cm², about 16.0 to about 22.0 mg/cm², about 16.5 to about 22.0 mg/cm², about 17.0 to about 22.0 mg/cm², about 17.5 to about 22.0 mg/cm², about 18.0 to about 22.0 mg/cm², about 18.5 to about 22.0 mg/cm², about 19.0 to about 22.0 mg/cm², about 19.5 to about 22.0 mg/cm², about 20.0 to about 22.0 mg/cm², about 20.5 to about 22.0 mg/cm² about 21.0 to about 22.0 mg/cm² or about 21.5 to about 22.0 mg/cm².

In some embodiments, the designated layer loading per single side of the first and the second positive electrode material layer may be, for example, about 4.0 to about 22.0 mg/cm², about 4.0 to about 21.5 mg/cm², about 4.0 to about 21.0 mg/cm², about 4.0 to about 20.5 mg/cm², about 4.0 to about 20.0 mg/cm², about 4.0 to about 19.5 mg/cm², about 4.0 to about 19.0 mg/cm², about 4.0 to about 18.5 mg/cm², about 4.0 to about 18.0 mg/cm², about 4.0 to about 17.5, about 4.0 to about 17.0 mg/cm², about 4.0 to about 16.5 mg/cm², about 4.0 to about 16.0 mg/cm², about 4.0 to about 15.5 mg/cm², about 4.0 to about 15.0 mg/cm², about 4.0 to about 14.5 mg/cm², about 4.0 to about 14.0 mg/cm², about 4.0 to about 13.5 mg/cm², about 4.0 to about 13.0 mg/cm², about 4.0 to about 12.5 mg/cm², about 4.0 to about 12.0 mg/cm², about 4.0 to about 11.5 mg/cm², about 4.0 to about 11.0 mg/cm², about 4.0 to about 10.5 mg/cm², about 4.0 to about 10.0 mg/cm², about 4.0 to about 9.5 mg/cm², about 4.0 to about 9.0 mg/cm², about 4.0 to about 8.5 mg/cm², about 4.0 to about 8.0 mg/cm², about 4.0 to about 7.5 mg/cm², about 4.0 to about 7.0 mg/cm², about 4.0 to about 6.5 mg/cm², about 4.0 to about 6.0 mg/cm² about 4.0 to about 5.5 mg/cm², about 4.0 to about 5.0 mg/cm² or about 4.0 to about 4.5 mg/cm²

In some embodiments, the designated layer loading per single side of the first and the second positive electrode material layer may be, for example, about 5.0 mg/cm², about 5.5 mg/cm², about 6.0 mg/cm², about 6.5 mg/cm², about 7.0 mg/cm², about 7.5 mg/cm², about 8.0 mg/cm², about 8.5 mg/cm², about 9.0 mg/cm², about 9.5 mg/cm², about 10.0 mg/cm², about 10.5 mg/cm², about 11.0 mg/cm², about 11.5 mg/cm², about 12.0 mg/cm², about 12.5 mg/cm², about 13.0 mg/cm², about 13.5 mg/cm², about 14.0 mg/cm², about 14.5 mg/cm², about 15.0 mg/cm², about 15.5 mg/cm², about 16.0 mg/cm², about 16.5 mg/cm², about 17.0 mg/cm², about 17.5 mg/cm², about 18.0 mg/cm², about 18.5 mg/cm², about 19.0 mg/cm², about 19.5 mg/cm², about 20.0 mg/cm², about 20.5 mg/cm², about 21.0 mg/cm², about 21.5 mg/cm², about 22.0 mg/cm².

In some embodiments, true total loading per single side may be, for example, about 15.0 to about 25.0 mg/cm².

In some embodiments, true total loading per single side may be, for example, about 15.5 to about 25.0 mg/cm², about 16.0 to about 25.0 mg/cm², about 16.5 to about 25.0 mg/cm², about 17.0 to about 25.0 mg/cm², about 17.5 to about 25.0 mg/cm², about 18.0 to about 25.0 mg/cm², about 18.5 to about 25.0 mg/cm², about 19.0 to about 25.0 mg/cm², about 19.5 to about 25.0 mg/cm², about 20.0 to about 25.0 mg/cm², about 20.5 to about 25.0 mg/cm², about 21.0 to about 25.0 mg/cm², about 21.5 to about 25.0 mg/cm², about 22.0 to about 25.0 mg/cm², about 22.5 to about 25.0 mg/cm², about 23.0 to about 25.0 mg/cm², about 23.5 to about 25.0 mg/cm², about 24.0 to about 25.0 mg/cm² or about 24.5 to about 25.0 mg/cm².

In some embodiments, true total loading per single side may be, for example, about 15.0 to about 24.5 mg/cm², about 15.0 to about 24.0 mg/cm², about 15.0 to about 23.5 mg/cm², about 15.0 to about 23.0 mg/cm², about 15.0 to about 22.5 mg/cm², about 15.0 to about 22.0 mg/cm², about 15.0 to about 21.5 mg/cm², about 15.0 to about 21.0 mg/cm², about 15.0 to about 20.5 mg/cm², about 15.0 to about 20.0 mg/cm², about 15.0 to about 19.5 mg/cm², about 15.0 to about 19.0 mg/cm², about 15.0 to about 18.5 mg/cm², about 15.0 to about 18.0 mg/cm², about 15.0 to about 17.5 mg/cm², about 15.0 to about 17.0 mg/cm², about 15.0 to about 16.5 mg/cm², about 15.0 to about 16.0 mg/cm² or about 15.0 to about 15.5 mg/cm².

In some embodiments, true total loading per single side may be, for example, about 15.0 mg/cm², about 15.5 mg/cm², about 16.0 mg/cm², about 16.5 mg/cm², about 17.0 mg/cm², about 17.5 mg/cm², about 18.0 mg/cm², about 18.5 mg/cm², about 19.0 mg/cm², about 19.5 mg/cm², about 20.0 mg/cm², about 20.5 mg/cm², about 21.0 mg/cm², about 21.5 mg/cm², about 22.0 mg/cm², about 22.5 mg/cm², about 23.0 mg/cm², about 23.5 mg/cm², about 24.0 mg/cm², about 24.5 mg/cm² or about 25.0 mg/cm².

Density

In some embodiments, the density of the first and the second positive electrode material layer may be equal.

In some embodiments, the density of the first and the second positive electrode material layer may be different.

In some embodiments, the density of the first and the second positive electrode material layer may be, for example, about 2.00 to about 4.00 g/c.c.

In some embodiments, the density of the first and the second positive electrode material layer may be, for example, independently about 2.00 g/c.c., about 2.05 g/c.c., about 2.10 g/c.c., about 2.15 g/c.c., about 2.20 g/c.c., about 2.25 g/c.c., about 2.30 g/c.c., about 2.35 g/c.c., about 2.40 g/c.c., about 2.45 g/c.c., about 2.50 g/c.c., about 2.55 g/c.c., about 2.60 g/c.c., about 2.65 g/c.c., about 2.70 g/c.c., about 2.75 g/c.c., about 2.80 g/c.c., about 2.85 g/c.c., about 2.90 g/c.c., about 2.95 g/c.c., 3.00 g/c.c., about 3.05 g/c.c., about 3.10 g/c.c., about 3.15 g/c.c., about 3.20 g/c.c., about 3.25 g/c.c., about 3.30 g/c.c., about 3.35 g/c.c., about 3.40 g/c.c., about 3.45 g/c.c., about 3.50 g/c.c., about 3.55 g/c.c., about 3.60 g/c.c., about 3.65 g/c.c., about 3.70 g/c.c., about 3.75 g/c.c., about 3.80 g/c.c., about 3.85 g/c.c., about 3.90 g/c.c., about 3.95 g/c.c., or about 4.00 g/c.c.

Conductive Agent

A conductive agent may be included in the first positive electrode material layer and/or in the second positive electrode material layer.

The material for the conductive agent in the first positive electrode material layer and in the second positive electrode material layer is not particularly limited, and any known conductive material can be used. For example, the conductive material in the first positive electrode material layer and in the second positive electrode material layer can be independently selected from graphite, carbon black, acetylene black (AB), carbon nanotubes (CNT), carbon fiber (CF) (e.g., VGCF), graphene, soot or mixtures thereof.

In some embodiments, the weight percent of the conductive agent in the first positive electrode material layer and a weight percent of the conductive agent in the second positive electrode material layer may be, for example, independently 0.1 wt % to 3.0 wt %.

In some embodiments, the weight percent of the conductive agent in the first positive electrode material layer and a weight percent of the conductive agent in the second positive electrode material layer may be, for example, independently about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.1 wt %, 2.2 wt %, about 2.3 wt %, about 2.4 wt %, about 2.5 wt %, about 2.6 wt %, about 2.7 wt %, about 2.8 wt %, about 2.9 wt % or about 3.0 wt %.

Current Collector

The current collector of the cathode is not particularly limited and known materials and designs can be used. In a preferred embodiment, the current collector is a two-dimensional conducting support, such as a solid or perforated sheet, based on carbon or metal, for example, aluminum, nickel, steel, stainless steel, or carbon coated aluminum.

Binder

A binder may be included in the first positive electrode material layer and/or in the second positive electrode material layer.

The binder material of the positive electrode material layers is not particularly limited and known materials for this function can be used. For example, the binder material in the first positive electrode material layer and in the second positive electrode material layer may independently contain one or more of the following components: polyvinylidene fluoride (PVdF) and its copolymers, polytetrafluoroethylene (PTFE), polyacrylonitrile (PAN), polymethyl or polybutyl methacrylate, polyvinyl chloride (PVC), polyvinylformal, polyesters and amide block polyethers, polymers of acrylic acid, methylacrylic acid, acrylamide, itaconic acid, sulfonic acid, and their derivatives with lithium salt elastomers and cellulose compounds.

Among the elastomers which may be used, mention may be made of ethylene/propylene/diene terpolymers (EPDM), styrene/butadiene copolymers (SBR), acrylonitrile/butadiene copolymers (NBR), styrene/butadiene/styrene block copolymers (SBS) or styrene/acrylonitrile/styrene block copolymers (SIS), styrene/ethylene/butylene/styrene copolymers (SEBS), styrene/butadiene/vinylpyridine terpolymers (SBVR), polyurethanes (PU), neoprenes, polyisobutylenes (PIB), butyl rubbers and mixtures thereof.

The cellulose compound may be, for example, a carboxymethylcellulose (CMC), a hydroxypropylmethylcellulose (HPMC), a hydroxypropylcellulose (HPC), a hydroxyethylcellulose (HEC) or another cellulose derivative.

In some embodiments, a total weight ratio of the binder in the first positive electrode material layer and in the second positive electrode material layer may be, for example, 1.0 wt % to 20 wt % when a total weight of the multi-layer cathode coating is 100 wt %.

In some embodiments, a total weight ratio of the binder in the first positive electrode material layer and in the second positive electrode material layer may be, for example, about 1.0 wt %, about 1.5 wt %, about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, about 9.5 wt %, about 10.0 wt %, about 10.5 wt %, about 11.0 wt %, about 11.5 wt %, about 12.0 wt %, about 12.5 wt %, about 13.0 wt %, about 13.5 wt %, about 14.0 wt %, about 14.5 wt %, about 15.0 wt %, about 15.5 wt %, about 16.0 wt %, about 16.5 wt %, about 17.0 wt %, about 17.5 wt %, about 18.0 wt %, about 18.5 wt %, about 19.0 wt %, about 19.5 wt % or about 20.0 wt %.

In some embodiments, a total weight ratio of the binder in the first positive electrode material layer and in the second positive electrode material layer may be, for example, about 1.0 wt % to about 20 wt %, about 1.5 wt % to about 20 wt %, about 2.0 wt % to about 20 wt %, about 2.5 wt % to about 20 wt %, about 3.0 wt % to about 20 wt %, about 3.5 wt % to about 20 wt %, about 4.0 wt % to about 20 wt %, about 4.5 wt % to about 20 wt %, about 5.0 wt % to about 20 wt %, about 5.5 wt % to about 20 wt %, about 6.0 wt % to about 20 wt %, about 6.5 wt % to about 20 wt %, about 7.0 wt % to about 20 wt %, about 7.5 wt % to about 20 wt %, about 8.0 wt % to about 20 wt %, about 8.5 wt % to about 20 wt %, about 9.0 wt % to about 20 wt %, about 9.5 wt % to about 20 wt %, about 10.0 wt % to about 20 wt %, about 10.5 wt % to about 20 wt %, about 11.0 wt % to about 20 wt %, about 11.5 wt % to about 20 wt %, about 12.0 wt % to about 20 wt %, about 12.5 wt % to about 20 wt %, about 13.0 wt % to about 20 wt %, about 13.5 wt % to about 20 wt %, about 14.0 wt % to about 20 wt %, about 14.5 wt % to about 20 wt %, about 15.0 wt % to about 20 wt %, about 15.5 wt % to about 20 wt %, about 16.0 wt % to about 20 wt %, about 16.5 wt % to about 20 wt %, about 17.0 wt % to about 20 wt %, about 17.5 wt % to about 20 wt %, about 18.0 wt % to about 20 wt %, about 18.5 wt % to about 20 wt %, about 19.0 wt % to about 20 wt % or about 19.5 wt % to about 20 wt %.

In some embodiments, a total weight ratio of the binder in the first positive electrode material layer and in the second positive electrode material layer may be, for example, about 1.0 wt % to about 19.5 wt %, about 1.0 wt % to about 19.0 wt %, about 1.0 wt % to about 18.5 wt %, about 1.0 wt % to about 18.0 wt %, about 1.0 wt % to about 17.5 wt %, about 1.0 wt % to about 17.0 wt %, about 1.0 wt % to about 16.5 wt %, about 1.0 wt % to about 16.0 wt %, about 1.0 wt % to about 15.5 wt %, about 1.0 wt % to about 15.0 wt %, about 1.0 wt % to about 14.5 wt %, about 1.0 wt % to about 14.0 wt %, about 1.0 wt % to about 13.5 wt %, about 1.0 wt % to about 13.0 wt %, about 1.0 wt % to about 12.5 wt %, about 1.0 wt % to about 12.0 wt %, about 1.0 wt % to about 11.5 wt %, about 1.0 wt % to about 11.0 wt %, about 1.0 wt % to about 10.5 wt %, about 1.0 wt % to about 10.0 wt %, about 1.0 wt % to about 9.5 wt %, about 1.0 wt % to about 9.0 wt %, about 1.0 wt % to about 8.5 wt %, about 1.0 wt % to about 8.0 wt %, about 1.0 wt % to 7.5 wt %, about 1.0 wt % to 7.0 wt %, about 1.0 wt % to about 6.5 wt %, about 1.0 wt % to about 6.0 wt %, about 1.0 wt % to about 5.5 wt %, about 1.0 wt % to about 5.0 wt %, about 1.0 wt % about 4.5 wt %, about 1.0 wt % to about 4.0 wt %, about 1.0 wt % to 3.5 wt %, or about 1.0 wt % to about 3.0 wt %, about 1.0 wt % to about 2.5 wt %, about 1.0 wt % to about 2.0 wt % or about 1.0 wt % to about 1.5 wt %.

Methods of Making Cathodes

Methods of making cathodes are well known. For example, the cathode material can be combined with a binder material and/or a conductive material and applied to a current collector by a known method. For example, granules including the cathode material could be formed and pressed to the current collector by a known method, or a slurry including the cathode material and a solvent could be coated on the current collector and then dried by a known method. Both faces of the current collector may be coated with the multilayer coating.

The multilayer coating can be achieved by, for example, coating each layer separately or several layers simultaneously with a single pass.

Secondary Battery

The present disclosure also provides a secondary battery including a cathode having the positive electrode active material of the present disclosure, an anode, and an electrolytic solution. A separator can be disposed between the anode and the cathode.

The individual electrochemical cells of the present disclosure can be of any known type, such as cylindrical cell, button cell, prismatic cell, and pouch.

Anode

The structure of the negative electrode (or anode) is not particularly limited and known anode active materials can be used, as long as the material can function as the negative electrode active material of the lithium-ion battery. For example, the active material of the anode can include carbon-based negative electrode active materials, such as graphite and coke, alloy-based negative electrode active materials such as Si and/or Sn, SiOx, a lithium metal, a lithium titanate oxide (LTO), or a blend thereof. The anode active material can include particles of one these materials coated with a layer of conductive carbon (e.g., graphitic carbon) (e.g., particles of SiOx coated with carbon).

Similar to the cathode, the anode material can include the anode active material and a binder, and the anode material can be applied to a current collector. In a preferred embodiment, the anode active material of the present disclosure can account for about 50 wt % to about 99 wt % of the anode material (or any amount within this range, e.g., about 95 wt % to about 99 wt %, or about 97 wt % to about 99 wt %) of the anode material.

Electrolytic Solution

The electrolytic solution can be a known non-aqueous electrolytic solution, which includes a supporting salt or charge carrier (e.g., a lithium salt) dissolved in a solvent.

The lithium salt is not particularly limited and known lithium salts for use in non-aqueous lithium-ion batteries can be used. In preferred embodiments, the electrolyte salt may include one or more of lithium bis(fluorosulfonyl)imide ("LiFSI"), lithium bis(trifluoromethanesulfonyl)imide ("LiTFSI"), $LiBF_4$, lithium bis(oxalato)borate ("LiBOB"), $LiClO_4$, $LiAsF_6$, $LiPF_6$, $LiCF_3SO_3$, $LiAlCl_4$, lithium 4,5-dicyano-2-(trifluoromethyl)imidazole ("LiTDI"), $LiPO_2F_2$, and the like.

In preferred embodiments, the lithium salt concentration in the electrolytic solution is more than about 0.8M, more than 1.0M, more than about 1.2M, more than about 1.4M, more than about 1.5M, more than about 1.6M, more than about 1.7M, more than about 1.8M, or more than about 2.0M. In preferred embodiments, the salt concentration is less than about 4.0M, less than 3.6M, less than about 3.2M, less than about 2.8M, less than about 2.4M, less than about 2.0M, less than about 1.6M, or less than about 1.2M.

The solvent is not particularly limited and known solvents for non-aqueous lithium-ion batteries can be used. The solvent can be a single solvent or a mixture of a plurality solvents. The solvent can be selected from usual organic solvents, notably saturated cyclic carbonates, unsaturated cyclic carbonates, non-cyclic (or linear) carbonates, alkyl esters such as formates, acetates, propionates or butyrates, ethers, lactones such as gamma-butyrolactone, tetrahydrothiophene bioxide, nitrile solvents and mixtures thereof. Among such saturated cyclic carbonates, specific mention may be made, for example, of ethylene carbonate (EC), propylene carbonate (PC), butylene carbonate (BC), and mixtures thereof. Among unsaturated cyclic carbonates, specific mention may be made, for example, of vinylene carbonate (VC), its derivatives and mixtures thereof. Among non-cyclic carbonates, specific mention may be made, for example, of dimethyl carbonate (DMC), diethyl carbonate (DEC), ethyl methyl carbonate (EMC), dipropyl carbonate (DPC) and mixtures thereof. Among the alkyl esters, specific mention may be made, for example, of methyl acetate, ethyl acetate, methyl propionate, ethyl propionate, butyl propionate, methyl butyrate, ethyl butyrate, propyl butyrate and mixtures thereof. Among the ethers, mention may for example be made of dimethyl ether (DME) or diethyl ether (DEE), and mixtures thereof. Known fluorinated solvents can also be used, including, for example, fluorinated benzenes (such as hexafluorobenzene, pentafluorobenzene, 1,2,3,4-tetrafluorobenzene, etc.), fluorine substituted linear carbonates, etc.

The electrolytic solution may include a known additive for use in a non-aqueous lithium-ion battery.

One type of additive that may be included in the electrolytic solution is a gas-generation agent used for implementing a pressure-type current interrupt device (CID). Exemplary gas-generation agents include cyclohexylbenzene (CHB), biphenyls, and fluorinated biphenyls having an oxidation potential lower than that of the solvent in the electrolyte solution. When the lithium-ion battery reaches an overcharged state, the compound reacts to generate gas before the electrolyte solution decomposes. When included, the amount of the gas-generation agent is preferably about 0.01 wt % to about 10 wt % (or any amount within this range, such as, for example, about 0.1 wt % to about 5 wt %; or about 1 wt % to about 3 wt %).

Specific mention can also be made to the use of known film-forming additives for forming a solid-electrode interphase (SEI) film on the anode or cathode. For example, one such additive includes fluorinated compound additives, such as fluorinated ethylene carbonate (FEC). When included, FEC (and/or another additive) can be added to the solvent in an amount of about 0.1 to about 20 wt % based on the total weight of the solvent, or can be added in any amount with this range, such as, for example, about 1 to about 10 wt %, about 2 to about 9 wt %, about 3 to about 8 wt %, about 4 to 7 wt %, about 5 to about 6 wt %, about 1 to about 5 wt %, about 1 to about 4 wt %, about 1 to about 3 wt %, about 1 to about 2 wt %, about 2 to about 3 wt %, or about 0.1 to about 1 wt %.

Separator

The use of a separator is not particularly limited and known separators for secondary batteries can be used. Separators are placed between both electrodes, and typically show high ionic conductivity (e.g., allow cations (e.g., Lit) to pass therethrough), mechanical stability, and thermal stability. Separators are also known which stop the growth of a dendrite.

Conventional categories of separators include microporous membranes, nonwoven membranes, electrospun membranes, membranes with external surface modification, composite membranes, and polymer blends. In one embodiment, the separator is a microporous membrane made of a polyolefin-based material, such as, for example, a microporous membrane made of polyethylene (PE), polypropylene (PP) or the like.

In some embodiments, the battery does not contain an electrolytic solution and a separator. Instead, a solid electrolyte layer can be used that meets the function of both the separator and the electrolytic solution (i.e., a solvent-free electrolyte), such as a solid ion-conducting polymer that is in contact with both the negative electrode and the positive electrode. Solid electrolytes rely on ion hopping through rigid structures. Solid electrolytes may be also referred to as fast ion conductors or super-ionic conductors. Solid electrolytes may be also used for electrically insulating the positive and negative electrodes of a cell while allowing for the conduction of ions, e.g., Lit, through the electrolyte. In this case, a solid electrolyte layer may be also referred to as a solid electrolyte separator.

The use of a solid electrolyte separator is not particularly limited. Known solid electrolytes include polymer-based materials (e.g., polyethylene oxide (PEO), PEO-based materials (e.g., PEO-PPO, PEO-epichlorohydrin, methyleneoxy-PEO, PEO-PAAM, PEO-PMHS (polymethylhydrogen-siloxane), etc.)), ceramic-based materials, and cellulose based materials.

Battery Module, Pack and System

A battery module according to the present disclosure is a structure containing multiple secondary cells arranged side by side in a common casing; a battery pack is a structure containing a plurality of electrically connected battery modules; and a battery system is a structure containing a plurality of electrically connected cells or battery modules. A battery module or pack may contain one or more control systems (e.g., BMS).

It is well known and understood how to electrically connect secondary cells in series and in parallel. Several techniques are disclosed, for example, in U.S. Publication No. 2019/0123315 (the '315 application) and U.S. Publication No. 2019/0165584 (the '584 application), which are incorporated herein by reference for their disclosure of techniques for assembling a plurality of electrochemical cells and modules. Further, a battery system may comprise additional structure, including a BMS and a cooling system.

EXAMPLES

In the following, although embodiments of the present disclosure are described in further detail by means of Examples, the present disclosure is not limited thereto.

Example 1

In Example 1 (J'), a positive electrode was prepared having the following configuration.

A current collector was coated with a first positive electrode material layer and a second positive electrode material layer. The first positive electrode material layer was prepared by blending 12.5% CNT-coated LFMP (with CNT constituting about 2 wt % of the total weight) and 37.5% NMC622 based on the total weight of the first and second positive electrode active materials.

The second positive electrode material layer was prepared by blending 37.5% CNT-coated LFMP (about 2 wt % CNT) and 12.5% NMC622 based on the total weight of the first and the second positive electrode active materials.

The total weight of the first and the second positive electrode active materials was 94% based on the total weight of the multilayer coating.

The multilayer coating further contained 3% conductive carbon additives and 3% binder (PVDF copolymers) based on the total weight of the first and the second positive electrode material layer.

The density was 2.7 g/c.c. for the first positive electrode material layer and 2.45 g/c.c. for the second positive electrode material layer.

The porosity was 34% for the first positive electrode material layer and 39% for the second positive electrode material layer.

The designated layer loading was 10.5 mg/cm$^2$ per single side for the first positive electrode material layer and 10.5 mg/cm$^2$ per single side for the second positive electrode material layer. True total loading was 20.3 mg/cm$^2$.

The composition of the positive electrodes of Examples 1 and 2 and Comparative Examples 1, 2 and 3 is summarized in Table 1.

To complete a cell for testing, the electrolyte was 1M LiPF6 in EC/EMC/DMC (1:1:1 v/v) with 2% vinylene carbonate (VC) as additive, and the negative electrode was 94 wt % graphite, 1 wt % carbon black, and 5 wt % PVDF.

Example 2

The positive electrode of Example 2 (K') was prepared as described in Example 1, except that the first positive electrode material layer was prepared by blending 15.0% CNT-coated LFMP (about 2 wt % CNT) and 25.0% NMC622 based on the total weight of the first and second positive electrode active materials, and the second positive electrode material layer was prepared by blending 45.0% CNT-coated LFMP (about 2 wt % CNT) and 15.0% NMC622 based on the total weight of the first and the second positive electrode active materials.

The density was 2.6 g/c.c. for the first and the second positive electrode material layer. The porosity was 35% for the first and the second positive electrode material layer. The designated layer loading was 8.8 mg/cm$^2$ per single side for the first positive electrode material layer and 13.2 mg/cm$^2$ per single side for the second positive electrode material layer. True total loading was 20.5 mg/cm$^2$.

The electrolyte and negative electrode was the same as Example 1.

Example 3

The positive electrode of Example 3 (L') was prepared as described in Example 1, except that the first positive electrode material layer was prepared by blending 20.0% CNT-coated LFMP (about 2 wt % CNT) and 15.0% NMC622 based on the total weight of the first and second positive electrode active materials, and the second positive electrode material layer was prepared by blending 60.0% CNT-coated LFMP (about 2 wt % CNT) and 5% NMC622 based on the total weight of the first and the second positive electrode active materials.

The density was 2.45 g/c.c. for the first and the second positive electrode material layer. The porosity was 35% for the first and the second positive electrode material layer. The designated layer loading was 7.525 mg/cm$^2$ per single side for the first positive electrode material layer and 13.975 mg/cm$^2$ per single side for the second positive electrode material layer. True total loading was 20.5 mg/cm$^2$.

The composition of the positive electrode of Example 3 and Comparative Examples 4, 5 and 6 is summarized in Table 2.

The electrolyte and negative electrode was the same as Example 1.

Comparative Example 1

The positive electrode of Comparative Example 1 (J) was prepared as described in Example 1, except that the first positive electrode material layer was prepared with 50% NMC622 based on the total weight of the first and second positive electrode active materials, and the second positive electrode material layer was prepared with 50% CNT-coated LFMP (about 2 wt % CNT) based on the total weight of the first and second positive electrode active materials.

The density was 2.7 g/c.c. for the first and the second positive electrode material layer. The porosity was 34% for the first and the second positive electrode material layer. The designated layer loading was 10.5 mg/cm$^2$ per single side for the first and the second positive electrode material layer. True total loading was 19.3 mg/cm$^2$.

The electrolyte and negative electrode was the same as Example 1.

Comparative Example 2

The positive electrode of Comparative Example 2 (K) was prepared as described in Example 1, except that the first positive electrode material layer was prepared with 40% NMC622 based on the total weight of the first and second positive electrode active materials, and the second positive electrode material layer was prepared 60% CNT-coated LFMP (about 2 wt % CNT) based on the total weight of the first and second positive electrode active materials.

The density was 2.6 g/c.c. for the first and the second positive electrode material layer. The porosity was 35% for the first and the second positive electrode material layer. The designated layer loading was 8.8 mg/cm$^2$ per single side for the first positive electrode material layer and 13.2 mg/cm$^2$ for the second positive electrode material layer. True total loading was 20.9 mg/cm$^2$.

The electrolyte and negative electrode was the same as Example 1.

Comparative Example 3

The positive electrode of Comparative Example 3 (L) was prepared as described in Example 1, except that the first positive electrode material layer was prepared with 20% NMC622 based on the total weight of the first and second positive electrode active materials, and the second positive electrode material layer was prepared with 80% CNT-coated LFMP (about 2 wt % CNT) based on the total weight of the first and second positive electrode active materials. The density was 2.45 g/c.c. for the first and the second positive electrode material layer. The porosity was 35% for the first and the second positive electrode material layer. The designated layer loading was 4.300 mg/cm$^2$ per single side for the first positive electrode material layer and 17.200 mg/cm$^2$ for the second positive electrode material layer. True total loading was 20.4 mg/cm$^2$.

The electrolyte and negative electrode was the same as Example 1.

Comparative Example 4

The positive electrode of Comparative Example 4 (L-inverse) was prepared as described in Example 1, except that the first positive electrode material layer was prepared with 80.0% CNT-coated LFMP (about 2 wt % CNT) based on the total weight of the first and second positive electrode active materials, and the second positive electrode material layer was prepared with 20.0% NMC622 based on the total weight of the first and second positive electrode active materials. The density was 2.45 g/c.c. for the first and the second positive electrode material layer. The porosity was 35% for the first and the second positive electrode material layer. The designated layer loading was 17.200 mg/cm$^2$ per single side for the first positive electrode material layer and 4.300 mg/cm$^2$ for the second positive electrode material layer. True total loading was 20.9 mg/cm$^2$.

The electrolyte and negative electrode was the same as Example 1.

Comparative Example 5

The positive electrode of Comparative Example 5 (L-mix) was prepared with a single positive electrode material layer by blending 80% CNT-coated LFMP (about 2 wt % CNT) and 20% NMC622 based on the total weight of the positive electrode active material. The density was 2.45 g/c.c. for the single electrode material layer. The porosity was 35% for the single electrode material layer. The designated layer loading was 21.500 mg/cm$^2$ per single side. True total loading was 21.5 mg/cm$^2$.

The electrolyte and negative electrode was the same as Example 1.

Experiments

The prepared cells were tested as follows.
Discharge Capability of Cells Made with Positive Electrodes of Example 1 and Comparative Example 1

The prepared cells were tested for discharge capability (Ah). The results are shown in FIG. 1. As shown, the cell made with positive electrode of Example 1 had better discharge capability.
Discharge Capability of Cells Made with Positive Electrodes of Example 2 and Comparative Example 2

The prepared cells were tested for discharge capability. The results are shown in FIG. 2. As shown, the cell made with positive electrode of Example 2 performed better at high discharge rate.

Chargeability of Cells Made with Positive Electrodes of Example 2 (K') and Comparative Example 2 (K)

The prepared cells were tested for chargeability. The results are shown in FIG. 3. As shown, the cell made with positive electrode of Example 2 had better charge capability.

Capacity Retention of Cells Made with Positive Electrodes of Example 2 (K') and Comparative Example 2 (K).

The prepared cells were tested for capacity retention. The results are shown in FIG. 4. As shown, the cell made with positive electrode of Example 2 had better charge retention during life test.

Chargeability of Cells Made with Positive Electrodes of Example 3 (L') and Comparative Examples 3 (L), 4 (L-Inverse) and 5 (L-Mix)

The prepared cells were tested for chargeability. The results are shown in FIG. 5. As shown, the cell made with positive electrode of Example 3 had better chargeability.

The disclosure is susceptible to various modifications and alternative means, and specific examples thereof are herein described in detail. It should be understood, however, that the disclosure is not to be limited to the particular examples or methods disclosed, but to the contrary, the disclosure is to cover all modifications, equivalents, and alternatives falling within the spirit and scope of the claims.

The invention claimed is:

1. A positive electrode for a lithium-ion secondary battery, the positive electrode comprising:
   a current collector; and
   a multi-layer positive electrode coating comprising:
      a first positive electrode material layer, the first positive electrode material layer having a bottom surface disposed on the current collector and a top surface opposite to the bottom surface, and the first positive electrode material layer including a first positive active material, and
      a second positive electrode material layer, the second positive electrode material layer having a bottom surface disposed on and directly contacting the top surface of the first positive electrode material layer, and the second positive electrode material layer including a second positive active material,

TABLE 1

| | Example 1 (J') | | Comparative Example 1 (J) | | Example 2 (K') | | Comparative Example 2 (K) | |
| --- | --- | --- | --- | --- | --- | --- | --- | --- |
| 1st layer/2nd layer | 1st layer (bottom) | 2nd layer (top) | 1st layer (bottom) | 2nd layer (top) | 1st layer (bottom) | 2nd layer (top) | 1st layer (bottom) | 2nd layer (top) |
| Cathode material (%) | 12.5% CNT-coated LFMP + 37.5% NMC622 | 37.5% CNT-coated LFMP + 12.5% NMC622 | 50.0% NMC622 | 50.0% CNT-coated LFMP | 15.0% CNT-coated LFMP + 25.0% NMC622 | 45.0% CNT-coated LFMP + 15.0% NMC622 | 40.0% NMC622 | 60.0% CNT-coated LFMP |
| Active material (wt %) | | | | 9 | 4 | | | |
| Conductive Agent (wt %) | | | | 3 | | | | |
| Binder (wt %) | | | | 3 | | | | |
| Density (g/c.c.) | 2.70/2.45 | | 2.70 | | 2.60 | | 2.60 | |
| Porosity (%) | 34/39 | | 34 | | 35 | | 35 | |
| Designated layer loading (mg/cm$^2$, single side) | 10.5 | 10.5 | 10.5 | 10.5 | 8.8 | 13.2 | 8.8 | 13.2 |
| True total loading (mg/cm$^2$, single side) | 20.3 | | 19.3 | | 20.5 | | 20.9 | |

TABLE 2

| | Example 3 (L') | | Comparative Example 3 (L) | | Comparative Example 4 (L-inverse) | | Comparative Example 5 |
| --- | --- | --- | --- | --- | --- | --- | --- |
| 1st layer/2nd layer | 1st layer (bottom) | 2nd layer (top) | 1st layer (bottom) | 2nd layer (top) | 1st layer (bottom) | 2nd layer (top) | (L = mix) One layer |
| Cathode material (%) | 20.0% CNT-coated LFMP + 15.0% NMC622 | 60.0% CNT-coated LFMP + 5.0% NMC622 | 20.0% NMC622 | 80.0% CNT-coated LFMP | 80.0% CNT-coated LFMP | 20.0% NMC622 | 80.0% CNT-coated LFMP + 20.0% NMC622 |
| Active material (wt %) | | | | 94 | | | |
| Conductive Agent (wt %) | | | | 3 | | | |
| Binder (wt %) | | | | 3 | | | |
| Density (g/c.c.) | 2.45 | | 2.45 | | 2.45 | | 2.45 |
| Porosity (%) | 35 | | 35 | | 35 | | 35 |
| Designated layer loading (mg/cm$^2$, single side) | 7.525 | 13.975 | 4.300 | 17.200 | 17.200 | 4.300 | 21.500 |
| True total loading (mg/cm$^2$, single side) | 20.5 | | 20.4 | | 20.9 | | 21.5 | wherein
the positive electrode does not include any additional layer other than the first positive electrode material layer and the second positive electrode material layer,
the first positive active material comprises a material represented by the following Formula (A) and/or Formula (B) in a total weight ratio W, and a material represented by the following Formula (C) in a weight ratio U-X;
the second positive active material comprises a material represented by the following Formula (A) and/or Formula (B) in a total weight ratio Y, and a material represented by the following Formula (C) in a weight ratio Z;
the weight ratios W, X, U, Y, and Z are based on a total weight of the first positive active material and the second positive active material in the multi-layer positive electrode coating being 100 wt %;
W, U, Y, and Z are each greater than or equal to 0.0 wt % and less than 75.0 wt %;
W+U+Y+Z=100 wt %;
at least one of W and Y is not 0 wt %; and
at least one of U X and Z is not 0 wt %;

$$Li_{1+x}M1_aX_bPO_4 \quad \text{Formula (A)},$$

wherein, in Formula (A), MI is at least one of Fe, Mn, or Co; X is at least one of Ni, V, Y, Mg, Ca, Ba, Al, Sc, or Nd; 0≤x≤0.15; a>0; b>0; and optionally a+b=1;

$$Li_{1+x}V_{1-y}M_yPO_4F_z \quad \text{Formula (B)},$$

wherein, in Formula (B), 0<x≤1; 0≤y≤0.5; 0.8≤z≤1.2; and M is at least one of Ti, Al, Mg, Mn, Fe, Co, Y, Cr, Cu, Ni, or Zr.

$$Li_w(Ni_xMn_yCo_zM_t)O_2 \quad \text{Formula (C)},$$

wherein, in Formula (C), 0.9≤w≤1.1; x>0; y>0; z>0; t>0; M is at least one of Al, B, Mg, Si, Ca, Ti, V, Cr, Fe, Cu, Zn, Y, Zr, Nb, W, Mo, Sr, Ce, Ga, or Ta; and optionally x+y+z+t=1, wherein the first positive active material and the second positive active material are the same, and
wherein W does not equal Y, or U X does not equal Z, or both of W does not equal Y and U X does not equal Z.

2. The positive electrode according to claim 1, wherein at least one of the following Features (a) and (b) is satisfied:
Feature (a): an absolute value of a difference between the average particle size of the first positive active material and an average particle size of the second positive active material is 2.5 μm to 20.0 μm;
Feature (b): an absolute value of a difference between a porosity of the first positive electrode material layer and a porosity of the second positive electrode material layer is 2.5% to 50%.

3. The positive electrode according to claim 2, wherein at least the Feature (a) is satisfied.

4. The positive electrode according to claim 2, wherein at least the Feature (b) is satisfied.

5. The positive electrode according to claim 1, wherein 20.0 wt %≤(W+U)≤ 80.0 wt %.

6. The positive electrode according to claim 1, wherein 30.0 wt %≤(W+U)≤70.0 wt %.

7. The positive electrode according to claim 1, wherein
5.0 wt %≤W≤85.0 wt %,
5.0 wt %≤U≤85.0 wt %,
5.0 wt %≤Y≤85.0 wt %, and
5.0 wt %≤Z≤85.0 wt %.

8. The positive electrode according to claim 1, wherein the material represented by the Formula (A) is one of the following Formula (A1), Formula (A2), Formula (A3), Formula (A4), or a blend thereof:

$$Li_{1+x}FePO_4 \quad \text{Formula (A1)},$$

wherein, in Formula (A1), 0≤x≤0.15;

$$Li_{1+x}MnPO_4 \quad \text{Formula (A2)},$$

wherein, in Formula (A2), 0≤x≤0.15;

$$Li_{1+x}CoPO_4 \quad \text{Formula (A3)},$$

wherein, in Formula (A3), 0≤x≤0.15;

$$Li_{1+x}Fe_yMn_zX_bPO_4 \quad \text{Formula (A4)},$$

wherein, in Formula (A4), X is at least one of Ni, V, Y, Mg, Ca, Ba, Al, Sc, or Nd; 0≤x≤0.15; y>0; z>0; b≥0; and optionally y+z+b=1.

9. The positive electrode according to claim 1, wherein the material represented by the Formula (C) is $LiNi_{0.33}Mn_{0.33}Co_{0.33}O_2$ (NMC111), $LiNi_{0.5}Mn_{0.3}Co_{0.2}O_2$ (NMC532), $LiNi_{0.6}Mn_{0.2}Co_{0.2}O_2$ (NMC622), or $LiNi_{0.8}Mn_{0.1}Co_{0.1}O_2$ (NMC811).

10. The positive electrode according to claim 1, wherein an average coating weight of the first positive electrode material layer is 5.0 to 30.0 mg/cm²/side, and
an average coating weight of the second positive electrode material layer is 5.0 to 30.0 mg/cm²/side.

11. The positive electrode according to claim 1, wherein a total weight ratio of the first positive active material and the second positive active material is 75.0 wt % to 98.0 wt % when a total weight of the multi-layer positive electrode coating is 100 wt %.

12. The positive electrode according to claim 1, wherein an absolute value of a difference between W and Y is 10 wt % to 80 wt %.

13. The positive electrode according to claim 1, wherein an absolute value of a difference between U and Z is 10 wt % to 80 wt %.

14. A lithium-ion secondary battery, comprising:
the positive electrode according to claim 1;
a negative electrode; and
an electrolyte.

15. The positive electrode according to claim 8, wherein the first positive active material comprises a material represented by the Formula (A4) and a material represented by the Formula (C); and
the second positive active material comprises a material represented by the Formula (A4) and a material represented by the Formula (C).

16. The positive electrode according to claim 15, wherein the first positive active material consists of a material represented by the Formula (A4) and a material represented by the Formula (C); and
the second positive active material consists of a material represented by the Formula (A4) and a material represented by the Formula (C).

17. The positive electrode according to claim 15, wherein the material represented by the Formula (A4) is coated with carbon nanotubes.

18. The positive electrode according to claim 16, wherein the material represented by the Formula (A4) is coated with carbon nanotubes.

19. The positive electrode according to claim 16, wherein 30.0 wt %≤(W+U)≤70.0 wt % and 30.0 wt %≤(Y+Z)≤70.0 wt %.

* * * * *